Jan. 11, 1949.  H. J. MERTZ  2,458,720
POWER TRANSMISSION DRIVE ADJUSTMENT
Original Filed Aug. 30, 1945  2 Sheets-Sheet 1
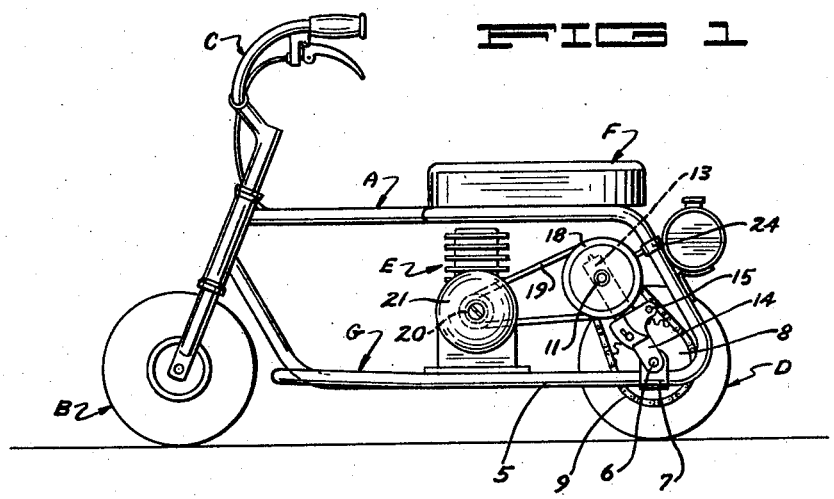
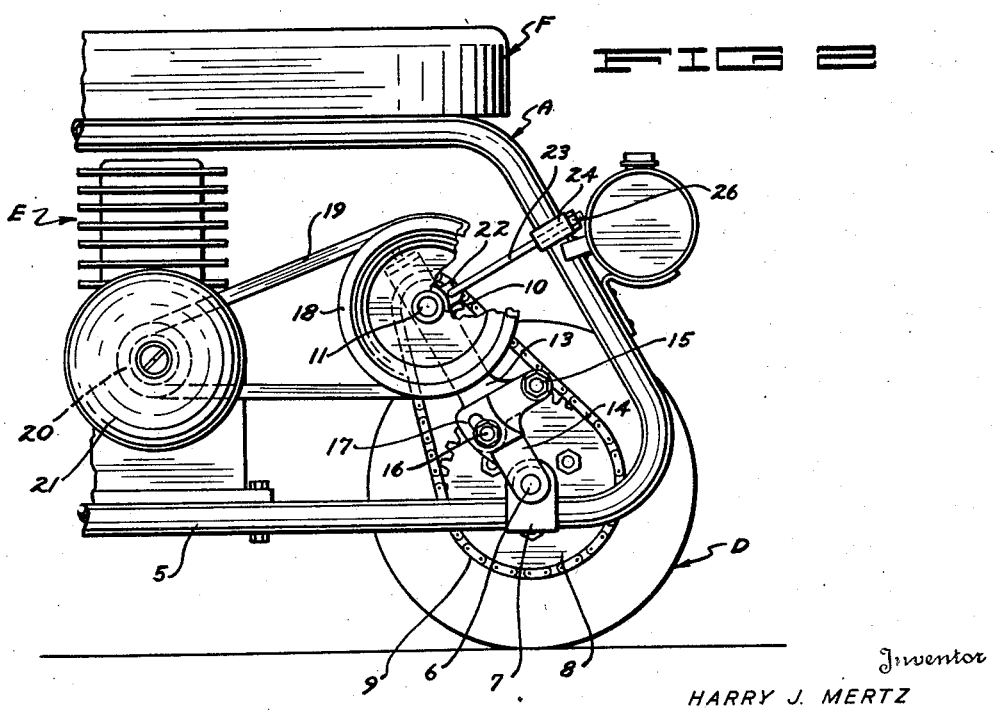
Inventor
HARRY J. MERTZ

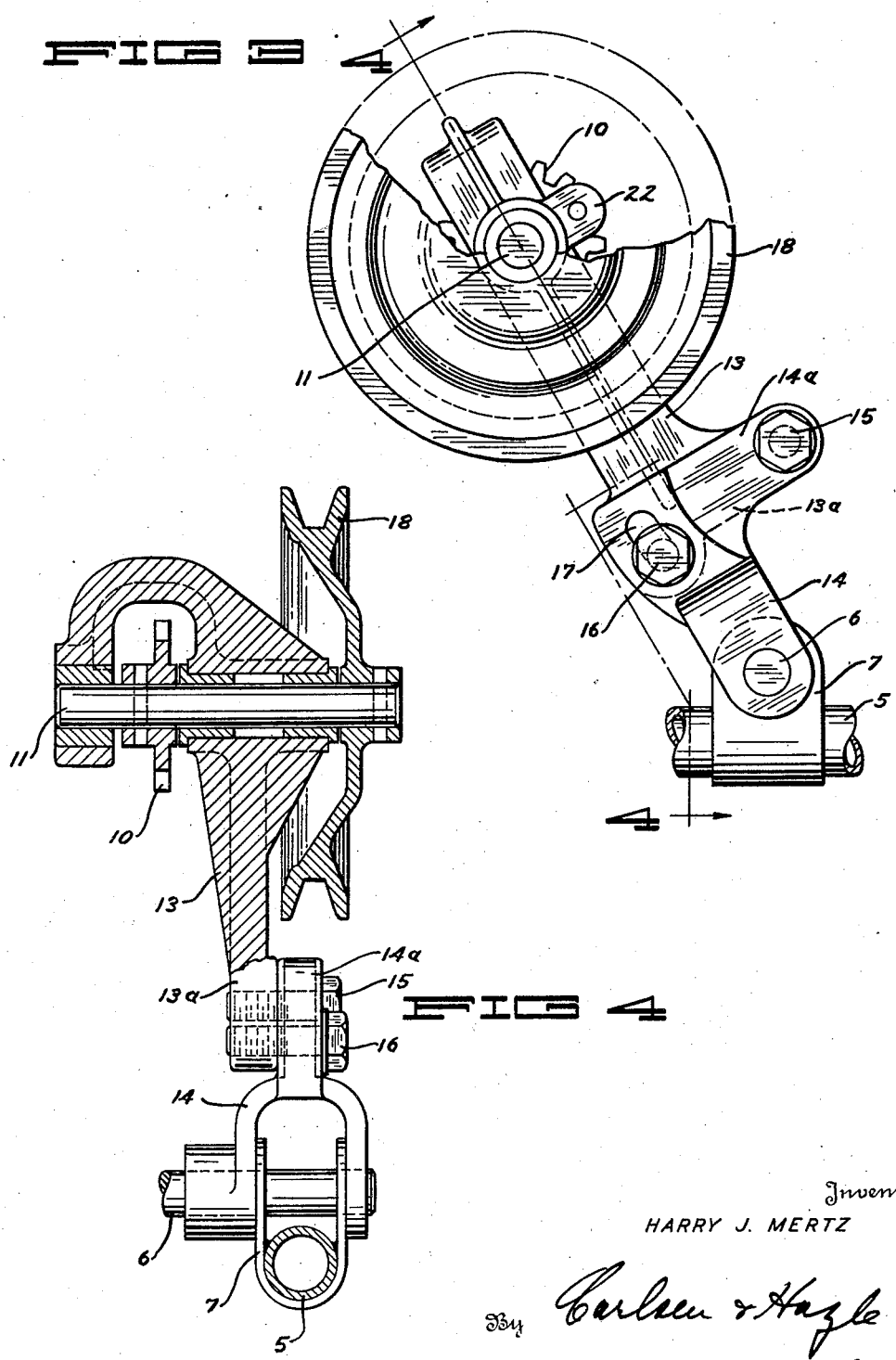

Patented Jan. 11, 1949

2,458,720

UNITED STATES PATENT OFFICE 2,458,720

POWER TRANSMISSION DRIVE ADJUSTMENT

Harry J. Mertz, Webster City, Iowa, assignor to Solar Corporation, Milwaukee, Wis., a corporation of Delaware Original application August 30, 1945, Serial No. 613,640. Divided and this application November 12, 1946, Serial No. 709,379

2 Claims. (Cl. 74—242.10)

This invention relates to power transmission mounting and adjusting devices for motor vehicles and the like, and the main object is to provide such a device that is particularly adaptable for use in vehicles of the motor-cycle or scooter type wherein a ground or traction wheel is driven by a motor mounted on the vehicle. In such vehicles it is necessary to drive the ground wheel at a speed considerably less than the R. P. M. speed of engine shaft, and to that end it is also customary to provide a transmission which includes a jack shaft having a relatively large pulley or sprocket, driven by the engine, and coupled with a smaller pinion or pulley which in turn drives a sprocket on the ground wheel.

Whether the jack shaft elements are pulleys or sprockets, or one of each, and connected to the engine and ground wheel by belts or chains, or by one of each, the shaft must of course be properly supported and whether chains or belts are employed as power transmitting elements it is highly desirable, if not absolutely necessary for practical purposes, to provide means for adjusting the tension of such belts and chains, to compensate for wear and stretch, if they are to be operated with a maximum degree of efficiency and with as long life as possible. It is to this end and for this purpose that I have designed the present construction which is not only very simple and efficient in operation, but also very rugged to withstand the shocks and vibrations to which a device of this nature is subjected.

The present application is a division of my parent application Serial No. 613,640, filed August 30, 1945, for Brake control and accelerator assembly.

In the accompanying drawings, which illustrate a preferred embodiment of the present invention:

Fig. 1 is a side elevation of a motor scooter embodying my invention, and as seen from the left.

Fig. 2 is an enlarged side elevation of the rear end portion of the vehicle, as seen in Fig. 1, and with parts thereof broken away for purpose of illustration.

Fig. 3 is an enlarged detail elevation of the adjustable jack shaft supporting bracket.

Fig. 4 is a partly sectional elevation of the supporting bracket and associated parts as seen substantially on the irregular line 4—4 in Fig. 3.

In referring to the various figures of the drawings more particularly and by reference characters, A designates generally the frame of the vehicle, the same being supported on a front wheel B steered by handle bar C, and by a rear drive wheel D driven by the engine E. The driver normally operates the machine by sitting on the seat F, and with his feet resting on a foot support G. The frame A, preferably formed of tubular metal or pipe, is comparatively narrow at its forward part, but the rear portion is bifurcated and includes two transversely spaced, rigidly connected frame bars 5 disposed in vertical parallel planes, and the upper parts of which support the seat F while the lower parts support the motor or engine E.

The rear wheel, D, is disposed between lower rear end parts of the bars 5, and is mounted on an axle 6 secured in bearing clips 7 fixed to the frame bars. This wheel, D, is provided with a sprocket gear 8, about which is trained a sprocket chain 9 to drive the gear and the wheel. The upper and more forward end of the chain 9 passes around a sprocket pinion 10 that is fixed on a jack shaft 11.

The jack shaft 11 is journaled by bushings 12 in the upper section 13 of a bracket 13—14, the lower section 14 of which is journaled for slight oscillating movement on the wheel shaft 6, as best shown in Figs. 3 and 4. Both bracket sections are generally L-shaped in form, each reversed with respect to the other, and the terminal ends of the adjacent section arms, 13a and 14a, are pivotally connected by bolt 15. A second bolt, 16, passes through a slot 17, in section 14, to thread into section 13 and this slot is arcuate with its axis coincident with bolt 15. The two bolts, when tightened, act as clamps to rigidly secure the two bracket sections together with fixed spacing between the shaft centers 6 and 11, but, when loosened, permit relative adjustments between the bracket sections as will control the spacing between shafts 6 and 11 and thereby produce the desired tension adjustments in the drive chain 9 to either take up slack or loosen the chain.

Fixed to the shaft 11 is a pulley 18 that is driven by a belt 19 which also passes over a similar but smaller pulley 20 on the engine shaft. An intermediate drive element in the form of a hydraulic coupling 21 may transmit rotary motion from the engine shaft to the pulley 20, but that forms no part of the invention, as such, and for present purposes the pulley 20 may be regarded as either directly or indirectly driven by the motor E.

With a view to providing means for conveniently regulating the tension of the belt 19, without disturbing the spacing between shafts 6 and 11, and in fact even while the motor is running, if so desired, I provide the bracket section 13 with a lug 22 to which is pivotally attached one end of a link bolt 23, the other or opposite end of which passes through a stop bracket 24, mounted on frame bar 5, and an adjuster nut 26 by which the effective length of the link may be regulated. It will thus be seen that by tightening up this nut 26 the rod or link 23 will operate to slightly swing the bracket 13—14 rearwardly and thereby increase the tension on belt 19. Conversely, by loosening the bolt the belt will be slacked off, but in no instance will this adjustment in any way affect the tension of the sprocket chain 9. It will of course be equally obvious that tension adjustments in the chain 9 will in no way affect the tension of belt 19, and even though both tensioning devices employ several elements common to the two.

It is understood that various modifications may be made in the structure herein disclosed without departing from the spirit and scope of the present invention. Having now therefore fully shown and described a preferred embodiment of the invention, what I claim to be new and desire to protect by Letters Patent is:

1. Mechanism for transmitting power from a rotary driving member to a rotary driven member having relatively fixed axes, comprising a speed change rotary member operationally interposed between the driving and driven members and respectively connected therewith by flexible power transmitting elements, a bracket fulcrumed coaxially with one of the first two mentioned rotary members and for supporting said speed change member, said bracket including two sections pivotally connected to each other and relatively adjustable about such pivot connection to regulate the effective length of the bracket.

2. Mechanism for transmitting power from a rotary driving member to a rotary driven member having relatively fixed axes, comprising a speed change rotary member operationally interposed between the driving and driven members and respectively connected therewith by flexible power transmitting elements, a bracket fulcrumed coaxially with one of the first two mentioned rotary members and for supporting said speed change member, said bracket including two sections pivotally connected to each other and relatively adjustable about such pivot connection to regulate the effective length of the bracket, one of said bracket sections having an arcuate slot the axis of which is coincident with the axis of the pivotal connection between the two sections, and the other bracket section having a bolt adjustable in the slot to releasably secure the bracket sections in relatively adjusted positions.

HARRY J. MERTZ.

REFERENCES CITED

The following references are of record in the file of this patent:

UNITED STATES PATENTS

| Number | Name | Date |
|---|---|---|
| 679,366 | Darling | July 30, 1901 |
| 729,197 | Mathieu | May 26, 1903 |
| 2,099,817 | Mahana | Nov. 23, 1937 |
| 2,171,032 | Guze | Aug. 29, 1939 |
| 2,258,778 | Lewis | Oct. 14, 1941 |